US009343056B1

(12) United States Patent
Goodwin

(10) Patent No.: US 9,343,056 B1
(45) Date of Patent: May 17, 2016

(54) WIND NOISE DETECTION AND SUPPRESSION

(71) Applicant: Knowles Electronics, LLC, Itasca, IL (US)

(72) Inventor: Michael M. Goodwin, Scotts Valley, CA (US)

(73) Assignee: Knowles Electronics, LLC, Itasca, IL (US)

( * ) Notice: Subject to any disclaimer, the term of this patent is extended or adjusted under 35 U.S.C. 154(b) by 149 days.

(21) Appl. No.: 14/313,883

(22) Filed: Jun. 24, 2014

Related U.S. Application Data

(63) Continuation of application No. 12/868,622, filed on Aug. 25, 2010, now Pat. No. 8,781,137.

(60) Provisional application No. 61/328,593, filed on Apr. 27, 2010.

(51) Int. Cl.
*H04B 15/00* (2006.01)
*G10K 11/00* (2006.01)

(52) U.S. Cl.
CPC .................................... *G10K 11/002* (2013.01)

(58) Field of Classification Search
CPC ...... H04R 3/00; H04R 2410/07; H04R 1/083; H04R 1/086; H04R 1/38; H04R 2499/13; H04R 3/007; H04R 2430/03; H04R 1/245; H04R 3/005; H04R 3/04; H04R 19/005; H04R 19/04; G10L 2021/02163; G10L 25/00; G10L 2021/02166; G10L 19/025; G10L 21/0208
USPC ............ 381/94.1–94.7, 71.13, 71.14, 92, 91; 455/501; 704/226, 233
See application file for complete search history.

(56) References Cited

U.S. PATENT DOCUMENTS 3,517,223 A 6/1970 Gaunt et al.
3,989,897 A 11/1976 Carver
4,811,404 A 3/1989 Vilmur et al.

(Continued)

FOREIGN PATENT DOCUMENTS

JP 2008065090 3/2008
TW 200933609 8/2009

(Continued)

OTHER PUBLICATIONS

3GPP2 "Enhanced Variable Rate Codec, Speech Service Options 3, 68, 70, and 73 for Wideband Spread Spectrum Digital Systems", May 2009, pp. 1-308.

(Continued)

*Primary Examiner* — Lun-See Lao
(74) *Attorney, Agent, or Firm* — Carr & Ferrell LLP

(57) ABSTRACT

Wind noise is detected in and removed from an acoustic signal. Features may be extracted from the acoustic signal. The extracted features may be processed to classify the signal as including wind noise or not. The wind noise may be removed before or during processing of the acoustic signal. The wind noise may be suppressed by estimating a wind noise model, deriving a modification, and applying the modification to the acoustic signal. In audio devices with multiple microphones, the channel exhibiting wind noise (i.e., acoustic signal frame associated with the wind noise) may be discarded for the frame in which wind noise is detected.

20 Claims, 7 Drawing Sheets

(56) References Cited

U.S. PATENT DOCUMENTS

| | | | | |
|---|---|---|---|---|
| 4,910,779 | A | 3/1990 | Cooper et al. | |
| 5,012,519 | A | 4/1991 | Adlersberg et al. | |
| 5,027,306 | A | 6/1991 | Dattorro et al. | |
| 5,050,217 | A | 9/1991 | Orban | |
| 5,103,229 | A | 4/1992 | Ribner | |
| 5,335,312 | A | 8/1994 | Mekata et al. | |
| 5,408,235 | A | 4/1995 | Doyle et al. | |
| 5,473,702 | A | 12/1995 | Yoshida et al. | |
| 5,687,104 | A | 11/1997 | Lane et al. | |
| 5,701,350 | A | 12/1997 | Popovich | |
| 5,774,562 | A | 6/1998 | Furuya et al. | |
| 5,796,850 | A | 8/1998 | Shiono et al. | |
| 5,806,025 | A | 9/1998 | Vis et al. | |
| 5,828,997 | A | 10/1998 | Durlach et al. | |
| 5,917,921 | A | 6/1999 | Sasaki et al. | |
| 5,950,153 | A | 9/1999 | Ohmori et al. | |
| 5,963,651 | A | 10/1999 | Van Veen et al. | |
| 5,974,379 | A | 10/1999 | Hatanaka et al. | |
| 6,011,501 | A | 1/2000 | Gong et al. | |
| 6,104,993 | A | 8/2000 | Ashley | |
| 6,122,384 | A * | 9/2000 | Mauro | G10L 21/0232 381/94.1 |
| 6,138,101 | A | 10/2000 | Fujii | |
| 6,160,265 | A | 12/2000 | Bacchi et al. | |
| 6,240,386 | B1 | 5/2001 | Thyssen et al. | |
| 6,289,311 | B1 | 9/2001 | Omori et al. | |
| 6,326,912 | B1 | 12/2001 | Fujimori | |
| 6,343,267 | B1 | 1/2002 | Kuhn et al. | |
| 6,377,637 | B1 | 4/2002 | Berdugo | |
| 6,377,915 | B1 | 4/2002 | Sasaki | |
| 6,381,570 | B2 | 4/2002 | Li et al. | |
| 6,453,284 | B1 | 9/2002 | Paschall | |
| 6,480,610 | B1 | 11/2002 | Fang et al. | |
| 6,483,923 | B1 | 11/2002 | Marash | |
| 6,490,556 | B1 | 12/2002 | Graumann et al. | |
| 6,539,355 | B1 | 3/2003 | Omori et al. | |
| 6,594,367 | B1 | 7/2003 | Marash et al. | |
| 6,757,395 | B1 | 6/2004 | Fang et al. | |
| 6,876,859 | B2 | 4/2005 | Anderson et al. | |
| 6,895,375 | B2 | 5/2005 | Malah et al. | |
| 7,054,808 | B2 | 5/2006 | Yoshida | |
| 7,054,809 | B1 | 5/2006 | Gao | |
| 7,065,486 | B1 | 6/2006 | Thyssen | |
| 7,072,834 | B2 | 7/2006 | Zhou | |
| 7,110,554 | B2 | 9/2006 | Brennan et al. | |
| 7,245,767 | B2 | 7/2007 | Moreno et al. | |
| 7,254,535 | B2 | 8/2007 | Kushner et al. | |
| 7,257,231 | B1 | 8/2007 | Avendano et al. | |
| 7,283,956 | B2 | 10/2007 | Ashley et al. | |
| 7,343,282 | B2 | 3/2008 | Kirla et al. | |
| 7,346,176 | B1 | 3/2008 | Bernardi et al. | |
| 7,373,293 | B2 | 5/2008 | Chang et al. | |
| 7,379,866 | B2 | 5/2008 | Gao | |
| 7,461,003 | B1 | 12/2008 | Tanrikulu | |
| 7,472,059 | B2 | 12/2008 | Huang | |
| 7,516,067 | B2 | 4/2009 | Seltzer et al. | |
| 7,539,273 | B2 | 5/2009 | Struckman | |
| 7,546,237 | B2 | 6/2009 | Nongpiur et al. | |
| 7,574,352 | B2 | 8/2009 | Quatieri, Jr. | |
| 7,590,250 | B2 | 9/2009 | Ellis et al. | |
| 7,657,427 | B2 | 2/2010 | Jelinek | |
| 7,664,640 | B2 | 2/2010 | Webber | |
| 7,672,693 | B2 | 3/2010 | Kallio et al. | |
| 7,725,314 | B2 | 5/2010 | Wu et al. | |
| 7,769,187 | B1 | 8/2010 | Farrar et al. | |
| 7,792,680 | B2 | 9/2010 | Iser et al. | |
| 7,813,931 | B2 | 10/2010 | Hetherington et al. | |
| 7,873,114 | B2 | 1/2011 | Lin | |
| 7,925,502 | B2 | 4/2011 | Droppo et al. | |
| 7,957,542 | B2 | 6/2011 | Sarrukh et al. | |
| 7,986,794 | B2 | 7/2011 | Zhang | |
| 8,005,238 | B2 | 8/2011 | Tashev et al. | |
| 8,032,369 | B2 | 10/2011 | Manjunath et al. | |
| 8,046,219 | B2 | 10/2011 | Zurek et al. | |
| 8,060,363 | B2 | 11/2011 | Ramo et al. | |
| 8,078,474 | B2 | 12/2011 | Vos et al. | |
| 8,098,844 | B2 | 1/2012 | Elko | |
| 8,107,631 | B2 | 1/2012 | Merimaa et al. | |
| 8,107,656 | B2 | 1/2012 | Dreβler et al. | |
| 8,111,843 | B2 | 2/2012 | Logalbo et al. | |
| 8,112,272 | B2 | 2/2012 | Nagahama et al. | |
| 8,112,284 | B2 | 2/2012 | Kjorling et al. | |
| 8,140,331 | B2 | 3/2012 | Lou | |
| 8,155,346 | B2 | 4/2012 | Yoshizawa et al. | |
| 8,160,262 | B2 | 4/2012 | Buck et al. | |
| 8,160,265 | B2 | 4/2012 | Mao et al. | |
| 8,170,221 | B2 | 5/2012 | Christoph | |
| 8,180,062 | B2 | 5/2012 | Turku et al. | |
| 8,184,822 | B2 | 5/2012 | Carreras et al. | |
| 8,184,823 | B2 | 5/2012 | Itabashi et al. | |
| 8,190,429 | B2 | 5/2012 | Iser et al. | |
| 8,195,454 | B2 | 6/2012 | Muesch | |
| 8,204,253 | B1 | 6/2012 | Solbach | |
| 8,223,988 | B2 | 7/2012 | Wang et al. | |
| 8,249,861 | B2 | 8/2012 | Li et al. | |
| 8,271,292 | B2 | 9/2012 | Osada et al. | |
| 8,275,610 | B2 | 9/2012 | Faller et al. | |
| 8,280,730 | B2 | 10/2012 | Song et al. | |
| 8,311,817 | B2 | 11/2012 | Murgia et al. | |
| 8,359,195 | B2 | 1/2013 | Li | |
| 8,363,850 | B2 | 1/2013 | Amada | |
| 8,411,872 | B2 | 4/2013 | Stothers et al. | |
| 8,438,026 | B2 | 5/2013 | Fischer et al. | |
| 8,447,045 | B1 | 5/2013 | Laroche | |
| 8,447,596 | B2 | 5/2013 | Avendano et al. | |
| 8,473,285 | B2 | 6/2013 | Every et al. | |
| 8,473,287 | B2 | 6/2013 | Every et al. | |
| 8,526,628 | B1 | 9/2013 | Massie et al. | |
| 8,538,035 | B2 | 9/2013 | Every et al. | |
| 8,606,571 | B1 | 12/2013 | Every et al. | |
| 8,611,551 | B1 | 12/2013 | Massie et al. | |
| 8,611,552 | B1 | 12/2013 | Murgia et al. | |
| 8,682,006 | B1 | 3/2014 | Laroche et al. | |
| 8,700,391 | B1 | 4/2014 | Avendano et al. | |
| 8,761,410 | B1 | 6/2014 | Avendano et al. | |
| 8,781,137 | B1 * | 7/2014 | Goodwin | H04R 3/005 381/94.1 |
| 8,848,935 | B1 | 9/2014 | Massie et al. | |
| 8,958,572 | B1 | 2/2015 | Solbach | |
| 9,008,329 | B1 | 4/2015 | Mandel et al. | |
| 9,143,857 | B2 | 9/2015 | Every et al. | |
| 2001/0041976 | A1 | 11/2001 | Taniguchi et al. | |
| 2001/0044719 | A1 | 11/2001 | Casey | |
| 2001/0046304 | A1 | 11/2001 | Rast | |
| 2002/0036578 | A1 | 3/2002 | Reefman | |
| 2002/0052734 | A1 | 5/2002 | Unno et al. | |
| 2002/0097884 | A1 | 7/2002 | Cairns | |
| 2002/0128839 | A1 | 9/2002 | Lindgren et al. | |
| 2002/0194159 | A1 | 12/2002 | Kamath et al. | |
| 2003/0040908 | A1 * | 2/2003 | Yang | H04R 3/005 704/233 |
| 2003/0093278 | A1 | 5/2003 | Malah | |
| 2003/0162562 | A1 | 8/2003 | Curtiss et al. | |
| 2004/0047474 | A1 | 3/2004 | Vries et al. | |
| 2004/0153313 | A1 | 8/2004 | Aubauer et al. | |
| 2005/0049857 | A1 | 3/2005 | Seltzer et al. | |
| 2005/0069162 | A1 | 3/2005 | Haykin et al. | |
| 2005/0075866 | A1 | 4/2005 | Widrow | |
| 2005/0207583 | A1 | 9/2005 | Christoph | |
| 2005/0238238 | A1 | 10/2005 | Xu et al. | |
| 2005/0266894 | A9 | 12/2005 | Rankin | |
| 2005/0267741 | A1 | 12/2005 | Laaksonen et al. | |
| 2006/0074693 | A1 | 4/2006 | Yamashita | |
| 2006/0089836 | A1 | 4/2006 | Boillot et al. | |
| 2006/0116175 | A1 | 6/2006 | Chu | |
| 2006/0116874 | A1 | 6/2006 | Samuelsson et al. | |
| 2006/0165202 | A1 | 7/2006 | Thomas et al. | |
| 2006/0247922 | A1 | 11/2006 | Hetherington et al. | |
| 2007/0005351 | A1 | 1/2007 | Sathyendra et al. | |
| 2007/0038440 | A1 | 2/2007 | Sung et al. | |
| 2007/0041589 | A1 | 2/2007 | Patel et al. | |
| 2007/0053522 | A1 | 3/2007 | Murray et al. | |
| 2007/0055508 | A1 | 3/2007 | Zhao et al. | |
| 2007/0076896 | A1 | 4/2007 | Hosaka et al. | |

(56) References Cited

U.S. PATENT DOCUMENTS

| | | | |
|---|---|---|---|
| 2007/0088544 | A1 | 4/2007 | Acero et al. |
| 2007/0154031 | A1 | 7/2007 | Avendano et al. |
| 2007/0253574 | A1 | 11/2007 | Soulodre |
| 2007/0299655 | A1 | 12/2007 | Laaksonen et al. |
| 2008/0019548 | A1 | 1/2008 | Avendano |
| 2008/0147397 | A1 | 6/2008 | Konig et al. |
| 2008/0159573 | A1 | 7/2008 | Dressler et al. |
| 2008/0170716 | A1 | 7/2008 | Zhang |
| 2008/0186218 | A1 | 8/2008 | Ohkuri et al. |
| 2008/0187148 | A1 | 8/2008 | Itabashi et al. |
| 2008/0208575 | A1 | 8/2008 | Laaksonen et al. |
| 2008/0215344 | A1 | 9/2008 | Song et al. |
| 2008/0228474 | A1 | 9/2008 | Huang et al. |
| 2008/0232607 | A1 | 9/2008 | Tashev et al. |
| 2008/0317261 | A1* | 12/2008 | Yoshida .................. H04R 3/04 381/94.1 |
| 2009/0022335 | A1 | 1/2009 | Konchitsky et al. |
| 2009/0043570 | A1 | 2/2009 | Fukuda et al. |
| 2009/0067642 | A1 | 3/2009 | Buck et al. |
| 2009/0086986 | A1 | 4/2009 | Schmidt et al. |
| 2009/0095804 | A1 | 4/2009 | Agevik et al. |
| 2009/0112579 | A1 | 4/2009 | Li et al. |
| 2009/0119096 | A1 | 5/2009 | Gerl et al. |
| 2009/0129610 | A1 | 5/2009 | Kim et al. |
| 2009/0150144 | A1 | 6/2009 | Nongpiur et al. |
| 2009/0164212 | A1 | 6/2009 | Chan et al. |
| 2009/0175466 | A1 | 7/2009 | Elko et al. |
| 2009/0216526 | A1 | 8/2009 | Schmidt et al. |
| 2009/0220107 | A1 | 9/2009 | Every et al. |
| 2009/0228272 | A1 | 9/2009 | Herbig et al. |
| 2009/0238373 | A1 | 9/2009 | Klein |
| 2009/0248403 | A1 | 10/2009 | Kinoshita et al. |
| 2009/0287481 | A1 | 11/2009 | Paranjpe et al. |
| 2009/0287496 | A1 | 11/2009 | Thyssen et al. |
| 2009/0299742 | A1 | 12/2009 | Toman et al. |
| 2009/0304203 | A1 | 12/2009 | Haykin et al. |
| 2009/0315708 | A1 | 12/2009 | Walley et al. |
| 2009/0323982 | A1 | 12/2009 | Solbach et al. |
| 2010/0063807 | A1 | 3/2010 | Archibald et al. |
| 2010/0067710 | A1 | 3/2010 | Hendriks et al. |
| 2010/0076756 | A1 | 3/2010 | Douglas et al. |
| 2010/0076769 | A1 | 3/2010 | Yu |
| 2010/0082339 | A1* | 4/2010 | Konchitsky ......... G10L 21/0208 704/226 |
| 2010/0087220 | A1 | 4/2010 | Zheng et al. |
| 2010/0094622 | A1 | 4/2010 | Cardillo et al. |
| 2010/0103776 | A1 | 4/2010 | Chan |
| 2010/0158267 | A1 | 6/2010 | Thormundsson et al. |
| 2010/0198593 | A1 | 8/2010 | Yu |
| 2010/0223054 | A1 | 9/2010 | Nemer et al. |
| 2010/0272275 | A1 | 10/2010 | Carreras et al. |
| 2010/0272276 | A1 | 10/2010 | Carreras et al. |
| 2010/0282045 | A1 | 11/2010 | Chen et al. |
| 2010/0290636 | A1 | 11/2010 | Mao et al. |
| 2011/0007907 | A1 | 1/2011 | Park et al. |
| 2011/0019838 | A1 | 1/2011 | Kaulberg et al. |
| 2011/0026734 | A1* | 2/2011 | Hetherington ...... G10L 21/0208 381/94.1 |
| 2011/0038489 | A1 | 2/2011 | Visser et al. |
| 2011/0081026 | A1 | 4/2011 | Ramakrishnan et al. |
| 2011/0099010 | A1 | 4/2011 | Zhang |
| 2011/0099298 | A1 | 4/2011 | Chadbourne et al. |
| 2011/0103626 | A1 | 5/2011 | Bisgaard et al. |
| 2011/0137646 | A1 | 6/2011 | Ahgren et al. |
| 2011/0158419 | A1 | 6/2011 | Theverapperuma et al. |
| 2011/0164761 | A1 | 7/2011 | McCowan |
| 2011/0169721 | A1 | 7/2011 | Bauer et al. |
| 2011/0184732 | A1 | 7/2011 | Godavarti |
| 2011/0191101 | A1 | 8/2011 | Uhle et al. |
| 2011/0243344 | A1 | 10/2011 | Bakalos et al. |
| 2011/0251704 | A1 | 10/2011 | Walsh et al. |
| 2011/0257967 | A1 | 10/2011 | Every et al. |
| 2011/0274291 | A1 | 11/2011 | Tashev et al. |
| 2011/0299695 | A1 | 12/2011 | Nicholson |
| 2011/0301948 | A1 | 12/2011 | Chen |
| 2012/0010881 | A1 | 1/2012 | Avendano et al. |
| 2012/0017016 | A1 | 1/2012 | Ma et al. |
| 2012/0027218 | A1 | 2/2012 | Every et al. |
| 2012/0093341 | A1 | 4/2012 | Kim et al. |
| 2012/0116758 | A1 | 5/2012 | Murgia et al. |
| 2012/0143363 | A1 | 6/2012 | Liu et al. |
| 2012/0179461 | A1 | 7/2012 | Every et al. |
| 2012/0198183 | A1 | 8/2012 | Wetzel et al. |
| 2013/0066628 | A1 | 3/2013 | Takahashi |
| 2013/0231925 | A1 | 9/2013 | Avendano et al. |
| 2013/0251170 | A1 | 9/2013 | Every et al. |
| 2013/0322643 | A1 | 12/2013 | Every et al. |

FOREIGN PATENT DOCUMENTS

| | | |
|---|---|---|
| TW | 201205560 | 2/2012 |
| TW | 201207845 | 2/2012 |
| TW | 201214418 | 4/2012 |
| TW | I466107 | 12/2014 |
| WO | WO2009035614 | 3/2009 |
| WO | WO2011137258 | 3/2011 |
| WO | WO2011133405 | 10/2011 |
| WO | WO2012009047 | 1/2012 |

OTHER PUBLICATIONS

3GPP2 "Selectable Mode Vocoder (SMV) Service Option for Wideband Spread Spectrum Communication Systems", Jan. 2004, pp. 1-231.

3GPP2 "Source-Controlled Variable-Rate Multimode Wideband Speech Codec (VMR-WB) Service Option 62 for Spread Spectrum Systems", Jun. 11, 2004, pp. 1-164.

3GPP "3GPP Specification 26.071 Mandatory Speech CODEC Speech Processing Functions; AMR Speech Codec; General Description", http://www.3gpp.org/ftp/Specs/html-info/26071.htm, accessed on Jan. 25, 2012.

3GPP "3GPP Specification 26.094 Mandatory Speech Codec Speech Processing Functions; Adaptive Multi-Rate (AMR) Speech Codec; Voice Activity Detector (VAD)", http://www.3gpp.org/ftp/Specs/html-info/26094.htm, accessed on Jan. 25, 2012.

3GPP "3GPP Specification 26.171 Speech Codec Speech Processing Functions; Adaptive Multi-Rate—Wideband (AMR-WB) Speech Codec; General Description", http://www.3gpp.org/ftp/Specs/html-info26171.htm, accessed on Jan. 25, 2012.

3GPP "3GPP Specification 26.194 Speech Codec Speech Processing Functions; Adaptive Multi-Rate—Wideband (AMR-WB) Speech Codec; Voice Activity Detector (VAD)" http://www.3gpp.org/ftp/Specs/html-info26194.htm, accessed on Jan. 25, 2012.

International Telecommunication Union "Coding of Speech at 8 kbit/s Using Conjugate-Structure Algebraic-code-excited Linear-prediction (CS-ACELP)", Mar. 19, 1996, pp. 1-39.

International Telecommunication Union "Coding of Speech at 8 kbit/s Using Conjugate Structure Algebraic-code-excited Linear-prediction (CS-ACELP) Annex B: A Silence Compression Scheme for G.729 Optimized for Terminals Conforming to Recommendation V.70", Nov. 8, 1996, pp. 1-23.

International Search Report and Written Opinion dated Sep. 1, 2011 in Application No. PCT/US11/37250.

Cisco, "Understanding How Digital T1 CAS (Robbed Bit Signaling) Works in IOS Gateways", Jan. 17, 2007, http://www.cisco.com/image/gif/paws/22444/t1-cas-ios.pdf, accessed on Apr. 3, 2012.

International Search Report and Written Opinion mailed Jul. 5, 2011 in Patent Cooperation Treaty Application No. PCT/US11/32578.

International Search Report and Written Opinion mailed Jul. 21, 2011 in Patent Cooperation Treaty Application No. PCT/US11/34373.

Goldin et al., Automatic Volume and Equalization Control in Mobile Devices, AES, 2006.

Guelou et al., Analysis of Two Structures for Combined Acoustic Echo Cancellation and Noise Reduction, IEEE, 1996.

Fazel et al., An overview of statistical pattern recognition techniques for speaker verification, IEEE, May 2011.

Sundaram et al., Discriminating two types of noise sources using cortical representation and dimension reduction technique, IEE, 2007.

(56) References Cited

OTHER PUBLICATIONS

Bach et al., Learning Spectral Clustering with application to speech separation, Journal of machine learning research, 2006.
Hioka et al., Estimating Direct to Reverberant energy ratio based on spatial correlation model segregating direct sound and reverberation, IEEE, Conference Mar. 14-19, 2010.
Avendano et al., Study on Dereverberation of Speech Based on Temporal Envelope Filtering, IEEE, Oct. 1996.
Park et al., Frequency Domain Acoustic Echo Suppression Based on Soft Decision, Interspeech 2009.
Tognieri et al., a comparison of the LBG,LVQ,MLP,SOM and GMM algorithms for Vector Quantisation and Clustering Analysis, 1992.
Klautau et al., Discriminative Gaussian Mixture Models a Comparison with Kernel Classifiers, ICML, 2003.
Usher et. al., Enhancement of Spatial Sound Quality a New Reverberation Extraction Audio Upmixer, IEEE, 2007.
Hoshuyama et al., "A Robust Generalized Sidelobe Canceller with a Blocking Matrix Using Leaky Adaptive Filters" 1997.
Spriet et al., "The impact of speech detection errors on the noise reduction performance of multi-channel Wiener filtering and Generalized Sidelobe Cancellation" 2005.
Hoshuyama et al., "A Robust Adaptive Beamformer for Microphone Arrays with a Blocking Matrix Using Constrained Adaptive Filters" 1999.
Herbordt et al., "Frequency-Domain Integration of Acoustic Echo Cancellation and a Generalized Sidelobe Canceller with Improved Robustness" 2002.
Office Action mailed Jun. 5, 2014 in Taiwanese Patent Application 100115214, filed Apr. 29, 2011.
Office Action mailed Oct. 30, 2014 in Korean Patent Application No. 10-2012-7027238, filed Apr. 14, 2011.
Jung et al., "Feature Extraction through the Post Processing of WFBA Based on MMSE-STSA for Robust Speech Recognition," Proceedings of the Acoustical Society of Korea Fall Conference, vol. 23, No. 2(s), pp. 39-42, Nov. 2004.
Notice of Allowance dated Nov. 7, 2014 in Taiwanese Application No. 100115214, filed Apr. 29, 2011.
Krini, Mohamed et al., "Model-Based Speech Enhancement," in Speech and Audio Processing in Adverse Environments; Signals and Communication Technology, edited by Hansler et al., 2008, Chapter 4, pp. 89-134.
Office Action mailed Dec. 10, 2014 in Finnish Patent Application No. 20126083, filed Apr. 14, 2011.
Lu et al., "Speech Enhancement Using Hybrid Gain Factor in Critical-Band-Wavelet-Packet Transform", Digital Signal Processing, vol. 17, Jan. 2007, pp. 172-188.
Kim et al., "Improving Speech Intelligibility in Noise Using Environment-Optimized Algorithms," IEEE Transactions on Audio, Speech, and Language Processing, vol. 18, No. 8, Nov. 2010, pp. 2080-2090.
Sharma et al., "Rotational Linear Discriminant Analysis Technique for Dimensionality Reduction," IEEE Transactions on Knowledge and Data Engineering, vol. 20, No. 10, Oct. 2008, pp. 1336-1347.
Temko et al., "Classifiation of Acoustic Events Using SVM-Based Clustering Schemes," Pattern Recognition 39, No. 4, 2006, pp. 682-694.
Office Action mailed Jun. 26, 2015 in South Korean Patent Application 1020127027238 filed Apr. 14, 2011.
Office Action mailed Jun. 23, 2015 in Japanese Patent Application 2013-508256 filed Apr. 28, 2011.
Office Action mailed Jun. 23, 2015 in Finnish Patent Application 20126106 filed Apr. 28, 2011.
Office Action mailed Jul. 2, 2015 in Finnish Patent Application 20126083 filed Apr. 14, 2011.
Office Action mailed Jun. 17, 2015 in Japanese Patent Application 2013-519682 filed May 19, 2011.
Office Action mailed Jun. 23, 2015 in Japanese Patent Application 2013-506188 filed Apr. 14, 2011.
Non-Final Office Action, Aug. 17, 2012, U.S. Appl. No. 12/868,622, filed Aug. 25, 2010.
Final Office Action, Feb. 22, 2013, U.S. Appl. No. 12/868,622, filed Aug. 25, 2010.
Notice of Allowance, May 1, 2014, U.S. Appl. No. 12/868,622, filed Aug. 25, 2010.
Non-Final Office Action, Feb. 21, 2012, U.S. Appl. No. 13/288,858, filed Nov. 3, 2011.
Non-Final Office Action, May 11, 2012, U.S. Appl. No. 13/424,189, filed Mar. 19, 2012.
Non-Final Office Action, May 14, 2012, U.S. Appl. No. 12/832,901, filed Jul. 8, 2010.
Non-Final Office Action, Aug. 1, 2012, U.S. Appl. No. 12/860,043, filed Aug. 20, 2010.
Non-Final Office Action, Aug. 15, 2012, U.S. Appl. No. 12/876,861, filed Sep. 7, 2010.
Non-Final Office Action, Aug. 15, 2012, U.S. Appl. No. 13/493,648, filed Jun. 11, 2012.
Final Office Action, Sep. 4, 2012, U.S. Appl. No. 13/424,189, filed Mar. 19, 2012.
Final Office Action, Sep. 5, 2012, U.S. Appl. No. 12/832,901, filed Jul. 8, 2010.
Notice of Allowance, Sep. 10, 2012, U.S. Appl. No. 13/288,858, filed Nov. 3, 2011.
Non-Final Office Action, Sep. 28, 2012, U.S. Appl. No. 13/493,908, filed Jun. 11, 2012.
Non-Final Office Action, Nov. 1, 2012, U.S. Appl. No. 12/907,788, filed Oct. 19, 2010.
Non-Final Office Action, Nov. 7, 2012, U.S. Appl. No. 13/492,780, filed Jun. 8, 2012.
Final Office Action, Nov. 28, 2012, U.S. Appl. No. 13/424,189, filed Mar. 19, 2012.
Final Office Action, Nov. 30, 2012, U.S. Appl. No. 12/832,901, filed Jul. 8, 2010.
Non-Final Office Action, Dec. 5, 2012, U.S. Appl. No. 12/855,600, filed Aug. 12, 2010.
Non-Final Office Action, Dec. 12, 2012, U.S. Appl. No. 12/868,417, filed Aug. 25, 2010.
Final Office Action, Jan. 11, 2013, U.S. Appl. No. 13/493,648, filed Jun. 11, 2012.
Non-Final Office Action, Jan. 16, 2013, U.S. Appl. No. 12/832,920, filed Jul. 8, 2010.
Notice of Allowance, Jan. 18, 2013, U.S. Appl. No. 12/860,043, filed Aug. 22, 2010.
Notice of Allowance, Jan. 28, 2013, U.S. Appl. No. 12/876,861, filed Sep. 7, 2010.
Non-Final Office Action, Feb. 15, 2013, U.S. Appl. No. 12/963,497, filed Dec. 8, 2010.
Notice of Allowance, Mar. 4, 2013, U.S. Appl. No. 12/832,901, filed Jul. 8, 2010.
Final Office Action, Mar. 6, 2013, U.S. Appl. No. 13/493,908, filed Jun. 11, 2012.
Final Office Action, Mar. 7, 2013, U.S. Appl. No. 12/907,788, filed Oct. 19, 2010.
Notice of Allowance, Mar. 7, 2013, U.S. Appl. No. 13/424,189, filed Mar. 19, 2012.
Final Office Action, Mar. 19, 2013, U.S. Appl. No. 12/868,417, filed Aug. 25, 2010.
Non-Final Office Action, Mar. 28, 2013, U.S. Appl. No. 12/837,340, filed Jul. 15, 2010.
Advisory Action, Apr. 1, 2013, U.S. Appl. No. 13/493,648, filed Jun. 11, 2012.
Notice of Allowance, Apr. 22, 2013, U.S. Appl. No. 13/493,648, filed Jun. 11, 2012.
Non-Final Office Action, Apr. 24, 2013, U.S. Appl. No. 13/012,517, filed Jan. 24, 2011.
Non-Final Office Action, Apr. 25, 2013, U.S. Appl. No. 12/854,095, filed Aug. 10, 2010.
Non-Final Office Action, May 1, 2013, U.S. Appl. No. 12/895,254, filed Sep. 30, 2010.
Final Office Action, May 7, 2013, U.S. Appl. No. 12/855,600, filed Aug. 12, 2010.
Non-Final Office Action, May 8, 2013, U.S. Appl. No. 13/492,780, filed Jun. 8, 2012.

(56) References Cited

OTHER PUBLICATIONS

Notice of Allowance, May 13, 2013, U.S. Appl. No. 12/832,920, filed Jul. 8, 2010.
Advisory Action, May 14, 2013, U.S. Appl. No. 12/868,622, filed Aug. 25, 2010.
Non-Final Office Action, Jun. 18, 2013, U.S. Appl. No. 12/950,431, filed Nov. 19, 2010.
Non-Final Office Action, Jun. 19, 2013, U.S. Appl. No. 12/963,497, filed Dec. 8, 2010.
Non-Final Office Action, Jul. 18, 2013, U.S. Appl. No. 13/493,908, filed Jun. 11, 2012.
Notice of Allowance, Jul. 25, 2013, U.S. Appl. No. 12/837,340, filed Jul. 15, 2010.
Non-Final Office Action, Jul. 31, 2013, U.S. Appl. No. 13/009,732, filed Jan. 19, 2011.
Notice of Allowance, Aug. 2, 2013, U.S. Appl. No. 12/868,417, filed Aug. 25, 2010.
Non-Final Office Action, Aug. 6, 2013, U.S. Appl. No. 12/907,788, filed Oct. 19, 2010.
Non-Final Office Action, Aug. 15, 2013, U.S. Appl. No. 12/876,861, filed Sep. 7, 2010.
Notice of Allowance, Oct. 3, 2013, U.S. Appl. No. 13/157,238, filed Jun. 9, 2011.
Notice of Allowance, Oct. 9, 2013, U.S. Appl. No. 13/935,847, filed Jul. 5, 2013.
Notice of Allowance, Oct. 21, 2013, U.S. Appl. No. 12/895,254, filed Sep. 30, 2010.
Final Office Action, Oct. 21, 2013, U.S. Appl. No. 12/854,095, filed Aug. 10, 2010.
Final Office Action, Oct. 22, 2013, U.S. Appl. No. 12/854,095, filed Aug. 10, 2010.
Final Office Action, Oct. 23, 2013, U.S. Appl. No. 13/492,780, filed Jun. 8, 2012.
Non-Final Office Action, Nov. 20, 2013, U.S. Appl. No. 12/950,431, filed Nov. 19, 2010.
Final Office Action, Dec. 3, 2013, U.S. Appl. No. 13/012,517, filed Jan. 24, 2011.
Notice of Allowance, Jan. 30, 2014, U.S. Appl. No. 12/963,497, filed Dec. 8, 2010.
Final Office Action, Mar. 21, 2014, U.S. Appl. No. 13/493,908, filed Jun. 11, 2012.
Final Office Action, May 19, 2014, U.S. Appl. No. 12/907,788, filed Oct. 19, 2010.
Non-Final Office Action, May 23, 2014, U.S. Appl. No. 13/859,186, filed Apr. 9, 2013.
Notice of Allowance, Jun. 5, 2014, U.S. Appl. No. 12/950,431, filed Nov. 19, 2010.
Non-Final Office Action, Sep. 29, 2014, U.S. Appl. No. 13/493,908, filed Jun. 11, 2012.
Notice of Allowance, Sep. 30, 2014, U.S. Appl. No. 12/855,600, filed Aug. 12, 2010.
Non-Final Office Action, Oct. 6, 2014, U.S. Appl. No. 12/854,095, filed Aug. 10, 2010.
Non-Final Office Action, Nov. 19, 2014, U.S. Appl. No. 13/012,517, filed Jan. 24, 2011.
Notice of Allowance, Nov. 24, 2014, U.S. Appl. No. 13/492,780, filed Jun. 8, 2012.
Final Office Action, Dec. 3, 2014, U.S. Appl. No. 13/859,186, filed Apr. 9, 2013.
Final Office Action, Dec. 16, 2014, U.S. Appl. No. 13/009,732, filed Jan. 19, 2011.
Non-Final Office Action, Apr. 17, 2015, U.S. Appl. No. 13/888,796, filed May 7, 2013.
Notice of Allowance, May 20, 2015, U.S. Appl. No. 13/888,796, filed May 7, 2013.
Final Office Action, May 26, 2015, U.S. Appl. No. 13/493,908, filed Jun. 11, 2012.
Non-Final Office Action, Jun. 10, 2015, U.S. Appl. No. 14/628,109, filed Feb. 20, 2015.
Final Office Action, Jun. 17, 2015, U.S. Appl. No. 13/012,517, filed Jan. 24, 2011.
Non-Final Office, Jun. 24, 2015, U.S. Appl. No. 13/959,457, filed Aug. 5, 2013.
Non-Final Office Action, Jul. 7, 2015, U.S. Appl. No. 13/859,186, filed Apr. 9, 2013.
Final Office Action, Aug. 11, 2015, U.S. Appl. No. 12/854,095, filed Aug. 10, 2010.
Notice of Allowance, Sep. 21, 2015, U.S. Appl. No. 12/907,788, filed Oct. 19, 2010.
Non-Final Office Action, Nov. 2, 2015, U.S. Appl. No. 14/850,911, filed Sep. 10, 2015.

* cited by examiner

WIND NOISE DETECTION AND SUPPRESSION

CROSS-REFERENCE TO RELATED APPLICATIONS

This application is a continuation of U.S. application Ser. No. 12/868,622 (now issued as U.S. Pat. No. 8,781,137), filed Aug. 25, 2010, which claims the benefit of U.S. Provisional Application No. 61/328,593, filed Apr. 27, 2010, the disclosures of which are incorporated herein by reference.

BACKGROUND OF THE INVENTION

1. Field of the Invention

The present invention relates generally to audio processing, and more particularly to processing an audio signal to suppress noise.

2. Description of Related Art

Audio devices such as cellular phones are used in many types of environments, including outdoor environments. When used outdoors, an audio device may be susceptible to wind noise. Wind noise occurs primarily from actual wind, but also potentially from the flow of air from a talker's mouth, and is a widely recognized source of contamination in microphone transduction. Wind noise is objectionable to listeners, degrades intelligibility, and may impose an environmental limitation on telephone usage.

Wind interaction with one or more microphones is undesirable for several reasons. First and foremost, the wind may induce noise in the acoustic signal captured by a microphone susceptible to wind. Wind noise can also interfere with other signal processing elements, for example suppression of background acoustic noises.

Several methods exist for attempting to reduce the impact of wind noise during use of an audio device. One solution involves providing a physical shielding (such as a wind screen) for the microphone to reduce the airflow due to wind over the active microphone element. This solution is often too cumbersome to deploy in small devices such as mobile phones.

To overcome the shortcomings of the prior art, there is a need for an improved wind noise suppression system for processing audio signals.

SUMMARY OF THE INVENTION

The present technology detects and removes wind noise in an acoustic signal. Features may be extracted from the acoustic signal and processed to classify the signal as containing wind noise or not having wind noise. Detected wind noise may be removed before processing the acoustic signal further. Removing wind noise may include suppression of the wind noise by estimating a wind noise model, deriving a modification, and applying the modification to the acoustic signal. In audio devices with multiple microphones, the channel exhibiting wind noise (i.e., acoustic signal frame associated with the wind noise) may be discarded for the frame in which wind noise is detected. A characterization engine may determine wind noise is present based on features that exist at low frequencies and the correlation of features between microphones. The characterization engine may provide a binary output regarding the presence of wind noise or a continuous-valued characterization of wind noise presence. The present technology may independently detect wind noise in one or more microphones, and may either suppress detected wind noise or discard a frame from a particular microphone acoustic signal detected to have wind noise.

In an embodiment, noise reduction may be performed by transforming an acoustic signal from time domain to frequency domain sub-band signals. A feature may be extracted from a sub-band signal. The presence of wind noise may be detected in the sub-band based on the features.

A system for reducing noise in an acoustic signal may include at least one microphone, a memory, a wind noise characterization engine, and a modifier module. A first microphone may be configured to receive a first acoustic signal. The wind noise characterization engine may be stored in memory and executable to classify a sub-band of the first acoustic signal as wind noise. In some embodiments, the characterization engine may classify a frame of the first acoustic signal as containing wind noise. The modifier module may be configured to suppress the wind noise based on the wind noise classification. Additional microphone signals may be processed to detect wind noise in the corresponding additional microphone and the first microphone.

DETAILED DESCRIPTION OF THE INVENTION

The present technology detects and removes wind noise in an acoustic signal. Features may be extracted from the acoustic signal. The extracted features may be processed to classify the signal as containing wind noise or not. The wind noise may be removed before processing the acoustic signal further. The wind noise may be suppressed by estimating a wind noise model, deriving a modification, and applying the modification to the acoustic signal. In audio devices with multiple microphones, the channel exhibiting wind noise (i.e., acoustic signal frame associated with the wind noise) may be discarded for the frame in which wind noise is detected.

The extracted features may be processed by a characterization engine that is trained using wind noise signals and wind noise with speech signals, as well as other signals. The features may include a ratio between energy levels in low frequency bands and a total signal energy, the mean and variance of the energy ratio, and coherence between microphone signals. The characterization engine may provide a binary output regarding the presence of wind noise or a continuous-valued characterization of the extent of wind noise present in an acoustic signal.

The present technology may detect and process wind noise in an audio device having either a single microphone or multiple microphones. In the case of a single microphone device, detected wind noise may be modeled and suppressed. In the case of a multiple microphone device, wind noise may be detected, modeled and suppressed independently for each microphone. Alternatively, the wind noise may be detected and modeled based on a joint analysis of the multiple microphone signals, and suppressed in one or more selected microphone signals. Alternatively, the microphone acoustic signal in which the wind noise is detected may be discarded for the current frame, and acoustic signals from the remaining signals (without wind noise) may be processed for that frame.

Figure 1:
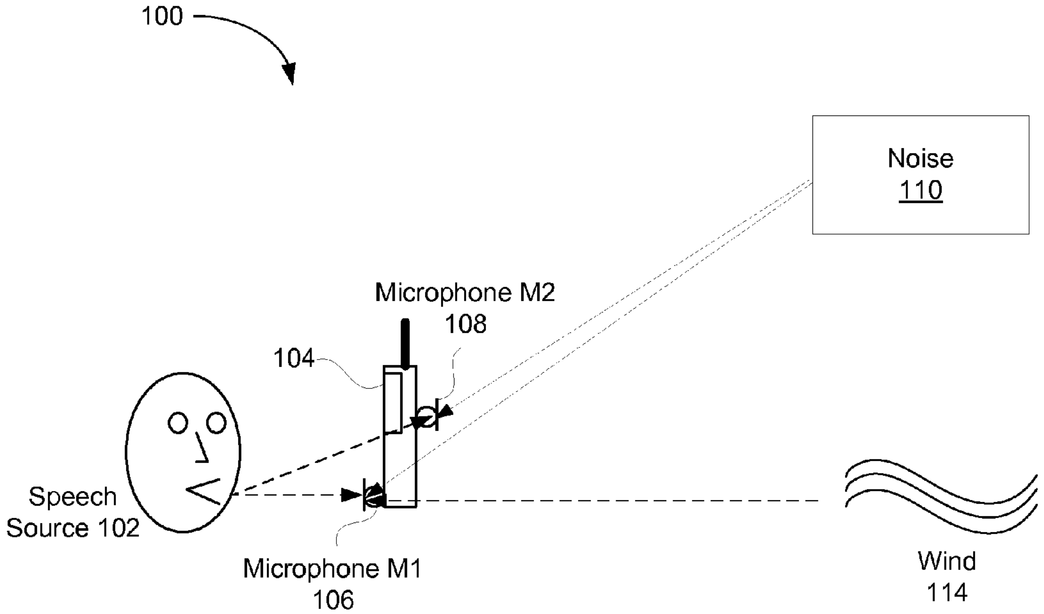
FIG. 1 is an illustration of an environment in which embodiments of the present technology may be used.

FIG. 1 illustrates an environment 100 in which embodiments of the present technology may be practiced. FIG. 1 includes audio source 102, exemplary audio device 104, and noise (source) 110. A user may act as an audio (speech) source 102 to an audio device 104. The exemplary audio device 104 as illustrated includes two microphones: a primary microphone 106 and a secondary microphone 108 located a distance away from the primary microphone 106. In other embodiments, the audio device 104 may include more than two microphones, such as for example three, four, five, six, seven, eight, nine, ten or even more microphones. The audio device may also be configured with only a single microphone.

Primary microphone 106 and secondary microphone 108 may be omni-directional microphones. Alternatively, embodiments may utilize other forms of microphones or acoustic sensors. While primary microphone 106 and secondary microphone 108 receive sound (i.e., acoustic signals) from the audio source 102, they also pick up noise 110. Although the noise 110 is shown coming from a single location in FIG. 1, the noise 110 may comprise any sounds from one or more locations different from the audio source 102, and may include reverberations and echoes. The noise 110 may be stationary, non-stationary, and/or a combination of both stationary and non-stationary noise. Echo resulting from a far-end talker is typically non-stationary.

The microphones may also pick up wind noise. The wind noise may come from wind 114, from the mouth of a user, or from some other source. The wind noise may occur in a single microphone or multiple microphones.

Some embodiments may utilize level differences (e.g., energy differences) between the acoustic signals received by the primary microphone 106 and secondary microphone 108. Because primary microphone 106 may be closer to the audio source 102 than secondary microphone 108, the intensity level is higher for primary microphone 106, resulting in a larger energy level received by primary microphone 106 during a speech/voice segment, for example.

The level difference may be used to discriminate speech and noise. Further embodiments may use a combination of energy level differences and time delays to discriminate speech. Based on these binaural cues, speech signal extraction or speech enhancement may be performed. An audio processing system may additionally use phase differences between the signals coming from different microphones to distinguish noise from speech, or one noise source from another noise source.

Figure 2:
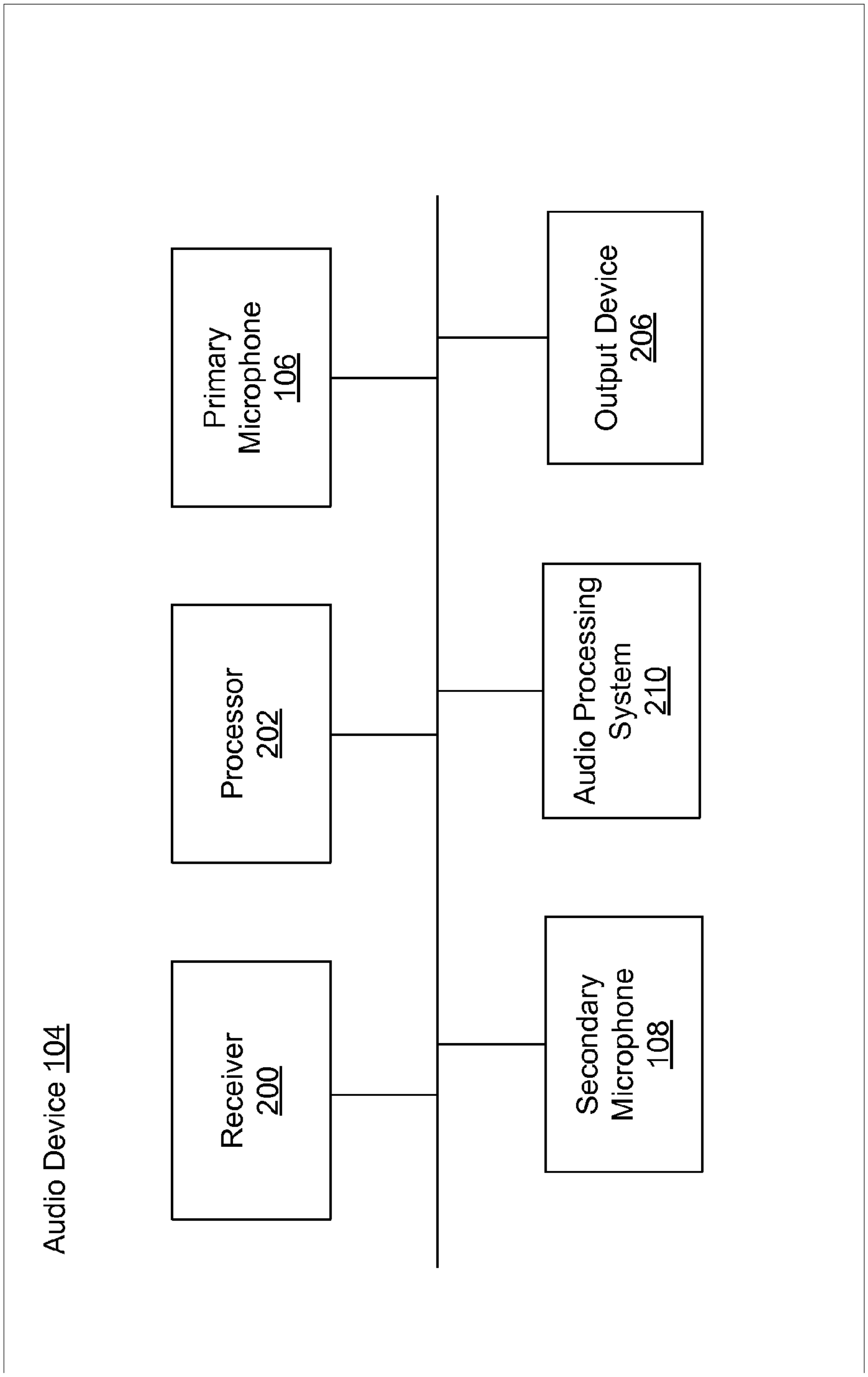
FIG. 2 is a block diagram of an exemplary audio device.

FIG. 2 is a block diagram of an exemplary audio device 104. In exemplary embodiments, the audio device 104 is an audio communication device, such as a cellular phone, that includes a receiver 200, a processor 202, the primary microphone 106, a secondary microphone 108, an audio processing system 210, and an output device 206. The audio device 104 may comprise additional or other components necessary for audio device 104 operations. Similarly, the audio device 104 may comprise fewer components, for example only one microphone, that perform similar or equivalent functions to those depicted in FIG. 2.

Processor 202 may include hardware and/or software which implement the processing function. Processor 202 may use floating point operations, complex operations, and other operations. The exemplary receiver 200 may receive a signal from a (communication) network. In some embodiments, the receiver 200 may include an antenna device (not shown) for communicating with a wireless communication network, such as for example a cellular communication network. The signals received by receiver 200, primary microphone 106, and secondary microphone 108 may be processed by audio processing system 210 and provided to output device 206. For example, audio processing system 210 may implement noise reduction techniques on the received signals.

The audio processing system 210 may furthermore be configured to receive acoustic signals from an acoustic source via the primary and secondary microphones 106 and 108 (e.g., primary and secondary acoustic sensors) and process the acoustic signals. Primary microphone 106 and secondary microphone 108 may be spaced a distance apart in order to allow for an energy level difference between them. After reception by primary microphone 106 and secondary microphone 108, the acoustic signals may be converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by primary microphone 106 is herein referred to as the primary acoustic signal, while the acoustic signal received by secondary microphone 108 is herein referred to as the secondary acoustic signal.

Embodiments of the present invention may be practiced with one or more microphones/audio sources. In exemplary embodiments, an acoustic signal from output device 206 may be picked up by primary microphone 106 or secondary microphone 108 unintentionally. This may cause reverberations or echoes, either of which is referred to as a noise source. The present technology may be used, e.g., in audio processing system 210, to perform noise cancellation on the primary and secondary acoustic signals.

Output device 206 is any device that provides an audio output to a listener (e.g., an acoustic source). Output device 206 may comprise a speaker, an earpiece of a headset, or handset on the audio device 104. Alternatively, output device 206 may provide a signal to a base-band chip or host for further processing and/or encoding for transmission across a mobile network or across voice-over-IP.

Embodiments of the present invention may be practiced on any device configured to receive and/or provide audio such as, but not limited to, cellular phones, phone handsets, headsets, and systems for teleconferencing applications. While some embodiments of the present technology are described in reference to operation on a cellular phone, the present technology may be practiced on any audio device.

Figure 3:
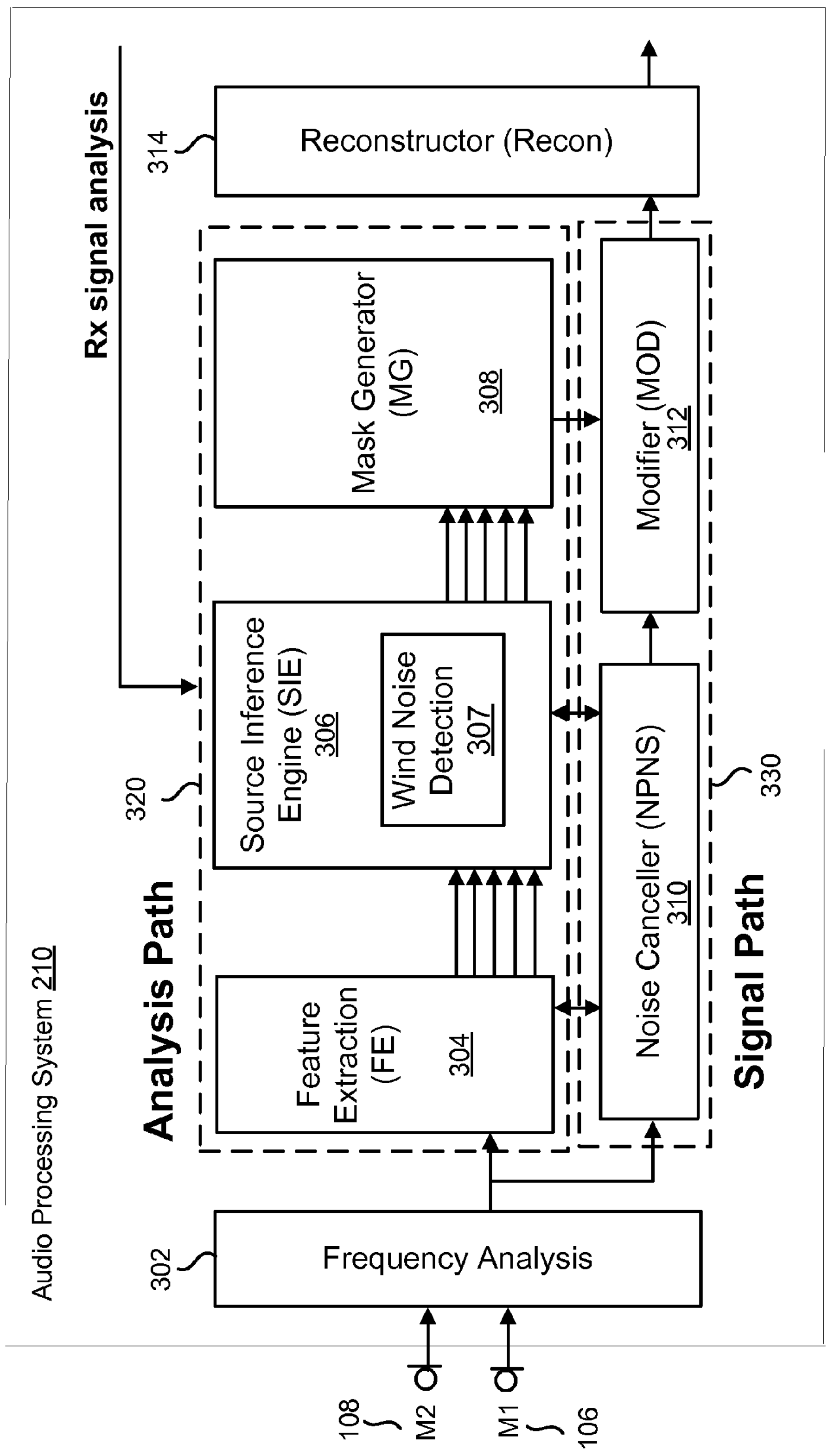
FIG. 3 is a block diagram of an exemplary audio processing system.

FIG. 3 is a block diagram of an exemplary audio processing system 210 for performing noise reduction as described herein. In exemplary embodiments, the audio processing system 210 is embodied within a memory device within audio device 104. The audio processing system 210 may include a frequency analysis module 302, a feature extraction module 304, a source inference engine module 306, mask generator module 308, noise canceller module 310, modifier module 312, and reconstructor module 314. Audio processing system 210 may include more or fewer components than illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number of and type of signals communicated between modules.

In operation, acoustic signals received from the primary microphone 106 and secondary microphone 108 are converted to electrical signals, and the electrical signals are processed through frequency analysis module 302. The acoustic signals may be pre-processed in the time domain before being processed by frequency analysis module 302. Time domain pre-processing may include applying input limiter gains, speech time stretching, and filtering using a Finite Impulse Response (FIR) or Infinite Impulse Response (IIR) filter.

The frequency analysis module 302 receives acoustic signals and may mimic the frequency analysis of the cochlea (e.g., cochlea domain), simulated by a filter bank. The frequency analysis module 302 separates each of the primary and secondary acoustic signals into two or more frequency sub-band signals. The frequency analysis module 302 may generate cochlea domain frequency sub-bands or frequency sub-bands in other frequency domains, for example sub-bands that cover a larger range of frequencies. A sub-band signal is the result of a filtering operation on an input signal, where the bandwidth of the filter is narrower than the bandwidth of the signal received by the frequency analysis module 302. The filter bank may be implemented by a series of cascaded, complex-valued, first-order IIR filters. Alternatively, other filters such as the short-time Fourier transform (STFT), sub-band filter banks, modulated complex lapped transforms, cochlear models, wavelets, etc., can be used for the frequency analysis and synthesis. The samples of the frequency sub-band signals may be grouped sequentially into time frames (e.g., over a predetermined period of time). For example, the length of a frame may be 4 ms, 8 ms, or some other length of time.

The sub-band frame signals are provided from frequency analysis module 302 to an analysis path sub-system 320 and a signal path sub-system 330. The analysis path sub-system 320 may process the signal to identify signal features, distinguish between speech components and noise components (which may include wind noise or be considered separately from wind noise) of the sub-band signals, and generate a signal modifier. The signal path sub-system 330 is responsible for modifying sub-band signals of the primary acoustic signal by reducing noise in the sub-band signals. Noise reduction can include applying a modifier, such as a multiplicative gain mask generated in the analysis path sub-system 320, or by subtracting components from the sub-band signals. The noise reduction may reduce noise and preserve the desired speech components in the sub-band signals.

Noise canceller module 310 receives sub-band frame signals from frequency analysis module 302. Noise canceller module 310 may subtract (e.g., cancel) a noise component from one or more sub-band signals of the primary acoustic signal. As such, noise canceller module 310 may output sub-band estimates of speech components in the primary signal in the form of noise-subtracted sub-band signals. Noise canceller module 310 may provide noise cancellation, for example in systems with two-microphone configurations, based on source location by means of a subtractive algorithm.

Noise canceller module 310 may provide noise cancelled sub-band signals to an Inter-microphone Level Difference (ILD) block in the feature extraction module 304. Since the ILD may be determined as the ratio of the Null Processing Noise Subtraction (NPNS) output signal energy to the secondary microphone energy, ILD is often interchangeable with Null Processing Inter-microphone Level Difference (NP-ILD). "Raw-ILD" may be used to disambiguate a case where the ILD is computed from the "raw" primary and secondary microphone signals.

The feature extraction module 304 of the analysis path sub-system 320 receives the sub-band frame signals derived from the primary and secondary acoustic signals provided by frequency analysis module 302 as well as the output of noise canceller module 310. Feature extraction module 304 may compute frame energy estimations of the sub-band signals and inter-microphone level differences (ILD) between the primary acoustic signal and the secondary acoustic signal, self-noise estimates for the primary and secondary microphones, as well as other monaural or binaural features which may be utilized by other modules, such as pitch estimates and cross-correlations between microphone signals. The feature extraction module 304 may both provide inputs to and process outputs from noise canceller module 310.

Source inference engine module 306 may process the frame energy estimates provided by feature extraction module 304 to compute noise estimates and derive models of the noise and/or speech in the sub-band signals. Source inference engine module 306 adaptively estimates attributes of the acoustic sources, such as the energy spectra of the output signal of the noise canceller module 310. The energy spectra attribute may be utilized to generate a multiplicative mask in mask generator module 308. This information is then used, along with other auditory cues, to define classification boundaries between source and noise classes. The NP-ILD distributions of speech, noise, and echo may vary over time due to changing environmental conditions, movement of the audio device 104, position of the hand and/or face of the user, other objects relative to the audio device 104, and other factors.

Source inference engine 306 may include wind noise detection module 307. The wind noise detection module may be implemented by one or more modules, including those illustrated in the block diagram of FIG. 3, to reduce wind noise in an acoustic signal. Wind noise detection module 307 is discussed in more detail below with respect to FIG. 4.

Mask generator module 308 receives models of the sub-band speech components and/or noise components as estimated by the source inference engine module 306 and generates a multiplicative mask. The multiplicative mask is applied to the estimated noise subtracted sub-band signals provided by noise canceller 310 to modifier 312. The modifier module 312 applies the multiplicative gain masks to the noise-subtracted sub-band signals of the primary acoustic signal output by the noise canceller module 310. Applying the mask reduces energy levels of noise components in the sub-band signals of the primary acoustic signal and results in noise reduction. The multiplicative mask is defined by a Wiener filter and a voice quality optimized suppression system.

Modifier module 312 receives the signal path cochlear samples from noise canceller module 310 and applies a gain mask received from mask generator 308 to the received samples. The signal path cochlear samples may include the noise subtracted sub-band signals for the primary acoustic signal. The mask provided by the Wiener filter estimation may vary quickly, such as from frame to frame, and noise and speech estimates may vary between frames. To help address the variance, the upwards and downwards temporal slew rates of the mask may be constrained to within reasonable limits by modifier 312. The mask may be interpolated from the frame rate to the sample rate using simple linear interpolation, and applied to the sub-band signals by multiplication. Modifier module 312 may output masked frequency sub-band signals.

Reconstructor module 314 may convert the masked frequency sub-band signals from the cochlea domain back into the time domain. The conversion may include applying gains and phase shifts to the masked sub-band signals and adding the resulting signals. Once conversion to the time domain is completed, the synthesized acoustic signal may be output to the user via output device 206 and/or provided to a codec for encoding.

In some embodiments, additional post-processing of the synthesized time domain acoustic signal may be performed. For example, comfort noise generated by a comfort noise generator may be added to the synthesized acoustic signal prior to providing the signal to the user. Comfort noise may be a uniform constant noise that is not usually discernible to a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and may be settable by a user. In some embodiments, the mask generator module 308 may have access to the level of comfort noise in order to generate gain masks that will suppress the noise to a level at or below the comfort noise.

The system of FIG. 3 may process several types of signals received by an audio device. The system may be applied to acoustic signals received via one or more microphones. The system may also process signals, such as a digital Rx signal, received through an antenna or other connection.

A suitable audio processing system for use with the present technology is discussed in U.S. patent application Ser. No. 12/832,920, filed Jul. 8, 2010, the disclosure of which is incorporated herein by reference.

Figure 4:
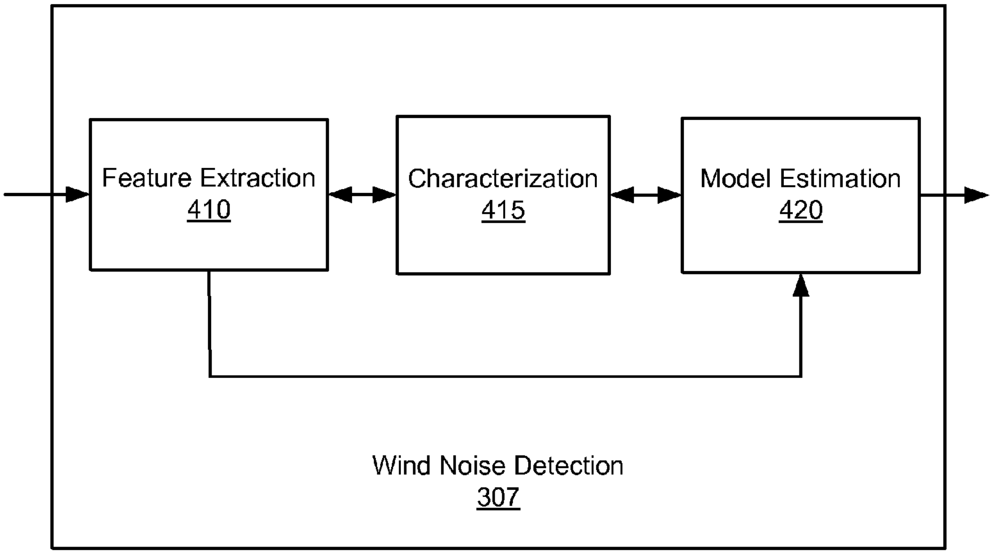
FIG. 4 is a block diagram of an exemplary wind noise detection module.

FIG. 4 is a block diagram of an exemplary wind noise detection module 307. Wind noise detection module 307 may include feature extraction module 410, characterization engine 415, and model estimation module 420. Each of the modules may communicate with each other within wind noise detection module 307.

Feature extraction module 410 may extract features from one or more microphone acoustic signals. The features may be used to detect wind noise in an acoustic signal. The features extracted for each frame of each acoustic signal may include the ratio of low frequency energy to the total energy, the mean of the energy ratio, and the variance of the energy ratio. The low frequency energy may be a measure of the energies detected in one or more low frequency sub-bands, for example sub-bands existing at 100 Hz or less. For an audio device with multiple microphones, the variance between energy signals in two or more microphones may also be determined. Feature extraction module 410 may be implemented as feature extraction module 304 or a separate module.

Characterization engine 415 may receive acoustic signal features from feature extraction module 410 and characterize one or more microphone acoustic signals as having wind noise or not having wind noise. An acoustic signal may be characterized as having wind noise per sub-band and frame. Characterization engine 415 may provide a binary indication or continuous-valued characterization indication as to whether the acoustic signal sub-band associated with the extracted features includes wind noise. In embodiments where a binary indication is provided, characterization engine 415 may be alternatively referred to as a classifier or classification engine. In embodiments where a continuous-valued characterization is provided, the present technology may utilize or adapt a classification method to provide a continuous-valued characterization.

Characterization engine 415 may be trained to enable characterization of a sub-band based on observed (extracted) features. The training may be based on actual wind noise with and without simultaneous speech. The characterization engine may be based on a training algorithm such as a linear discriminant analysis (LDA) or other methods suitable for the training of classification algorithms. Using an LDA algorithm, characterization engine 415 may determine a feature mapping to be applied to the features extracted by module 410 to determine a discriminant feature. The discriminant feature may be used to indicate a continuous-valued measure of the extent of wind noise presence. Alternatively, a threshold may be applied to the discriminant feature to form a binary decision as to the presence of wind noise. A binary decision threshold for wind noise characterization may be derived based on the mapping and/or observations of the values of the discriminant feature.

Model estimation module 420 may receive extracted features from feature extraction module 410 and a characterization indication from characterization engine 415 to determine whether wind noise should be reduced. If a sub-band is characterized as having wind noise, or a frame is characterized as having wind noise, a sub-band model of the wind noise may be estimated by model estimation module 420. The sub-band model of the wind noise may be estimated based on a function fit to the spectrum of the signal frame determined by the characterization engine 415 to include wind noise. The function may be any of several functions suitable to be fitted to detected wind noise energy. In one embodiment, the function may be an inverse of the frequency, and may be represented as $$F = \frac{A}{f^B},$$

wherein f is the frequency, and A and B are real numbers selected to fit the function F to the wind noise energy. Once the function is fitted, the wind noise may be filtered using a Wiener filter by modifier 312 of audio processing system 210 (communication between wind noise detection module 307 and modifier 312 not illustrated in FIGS. 3 and 4).

For each microphone, wind noise may be detected independently for that channel (i.e., microphone acoustic signal). When wind noise is detected by wind noise detection module 307 in an acoustic signal of a microphone, the wind noise may be suppressed using a function fitted to the noise and applied to the acoustic signal by modifier 312.

When an audio device 104 has two or more microphones 106 and 108, the features extracted to detect wind noise may be based on at least two microphones. For example, a level of coherence may be determined between corresponding sub-bands of two microphones. If there is a significant energy level difference, in particular in lower frequency sub-bands, the microphone acoustic signal sub-band with a higher energy level may likely have wind noise. When one of multiple microphone acoustic signals is characterized as having wind noise present, the sub-band containing the wind noise or the entire frame of the acoustic signal containing the wind noise may be discarded for the frame.

The wind noise detection may include detection based on two-channel features (such as coherence) and independent one-channel detection, to decide which subset of a set of microphones is contaminated with wind noise.

For suppressing the wind noise, the present technology may discard a frame or ignore a signal if appropriate (for instance by not running NPNS when the secondary channel is wind-corrupted). The present technology may also derive an appropriate modification (mask) from the two-channel features, or from a wind noise model, to suppress the wind noise in the primary channel.

Figure 5:
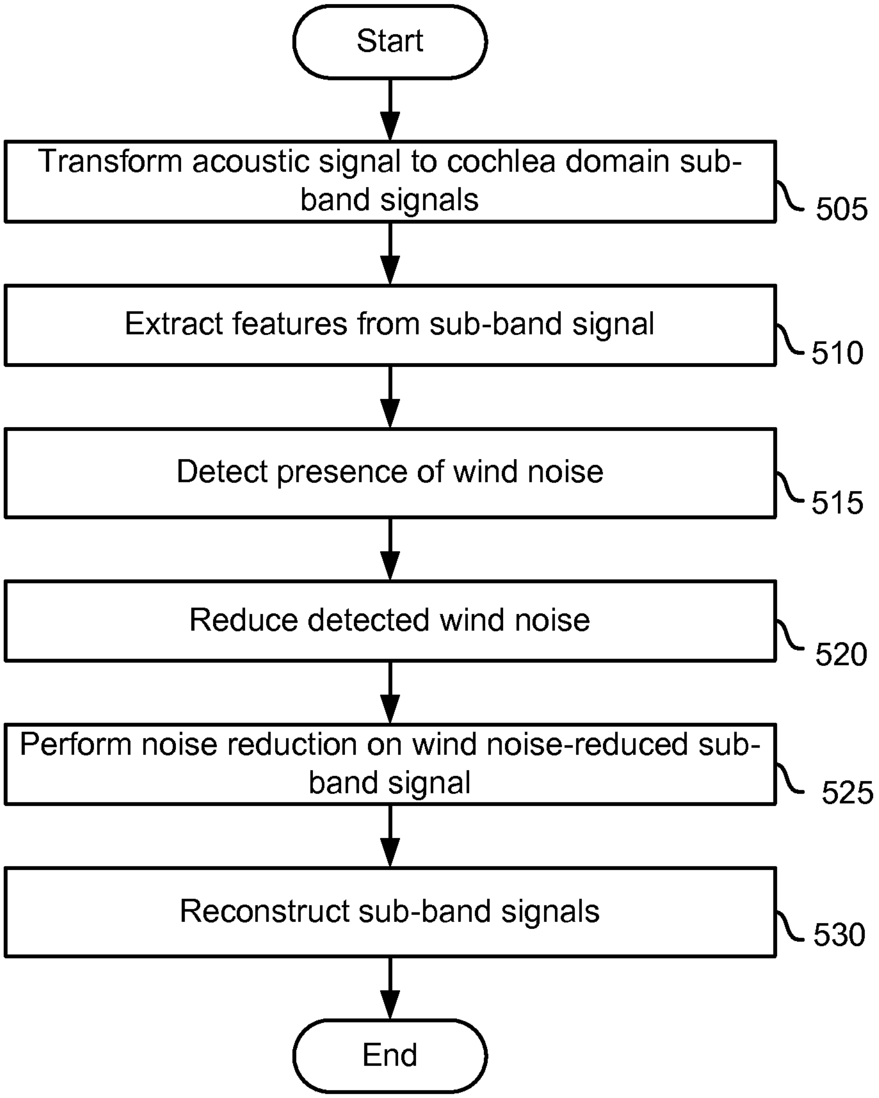
FIG. 5 is a flowchart of an exemplary method for performing noise reduction for an acoustic signal.

FIG. 5 is a flowchart of an exemplary method for performing noise reduction for an acoustic signal. An acoustic signal is transformed from a time domain signal to cochlea domain sub-band signals at step 505. In some embodiments, other frequency bands such as low-pass sub-bands may be used. Features may then be extracted from the sub-band signals at step 510. The features may include low frequency energy, total energy, the ratio of low frequency energy to total energy, the mean of the energy ratio, the variance of the energy ratio, correlation between multiple microphone sub-bands, and other features.

A presence of wind noise may be detected at step 515. Wind noise may be detected within a sub-band by processing the features, for example by a trained wind noise characterization engine. The wind noise may also be detected at frame level. Detecting wind noise is discussed in more detail in the method of FIG. 6.

Detected wind noise may be reduced at step 520. Wind noise reduction may include suppressing wind noise within a sub-band and discarding a sub-band or frame of an acoustic signal characterized as having wind noise within a particular frame. Reducing wind noise in an audio device 104 with a single microphone is discussed with respect to FIG. 7. Reducing wind noise in an audio device 104 with two or more microphones is discussed with respect to FIG. 8.

Noise reduction on the wind-noise reduced sub-band signal may be performed at step 525. After any detected wind noise reduction is performed, the signal may be processed to remove other noise, such as noise 110 in FIG. 1. By removing the wind noise before processing the acoustic signal for other noise and speech energies, the wind noise does not corrupt or adversely affect noise reduction of acoustic signals to remove sources such as noise 110. Alternatively, the present technology may combine the wind noise model with the other estimated noise models.

After performing noise reduction, the sub-band signals for a frame are reconstructed at step 530 and output.

Figure 6:
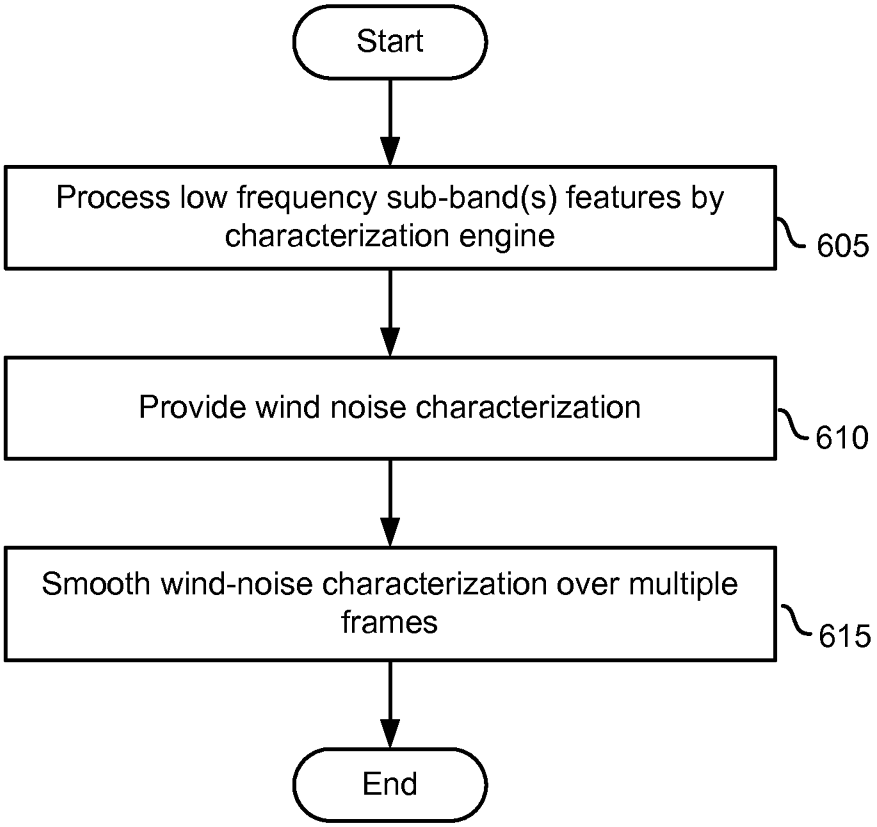
FIG. 6 is a flowchart of an exemplary method for detecting the presence of wind noise.

FIG. 6 is a flowchart of an exemplary method for detecting the presence of wind noise. Features based on one or more low frequency sub-bands may be processed by a characterization engine at step 605. The sub-bands may have frequencies of 100 Hz or lower. The features may include the ratio of low frequency sub-band energy to total signal energy as well as the mean and variance of this energy ratio. The features may also include a coherence between corresponding sub-bands for different microphones.

A wind noise characterization may be provided at step 610. The wind noise characterization may be provided by a characterization engine utilizing a characterization algorithm, such as, for example, an LDA algorithm. The characterization may take the form of a binary indication based on a decision threshold or a continuous characterization.

The wind noise characterization may be smoothed over multiple frames at step 615. The smoothing may help prevent frequent switching between a characterization of wind noise and no wind noise in consecutive frames.

Figure 7:
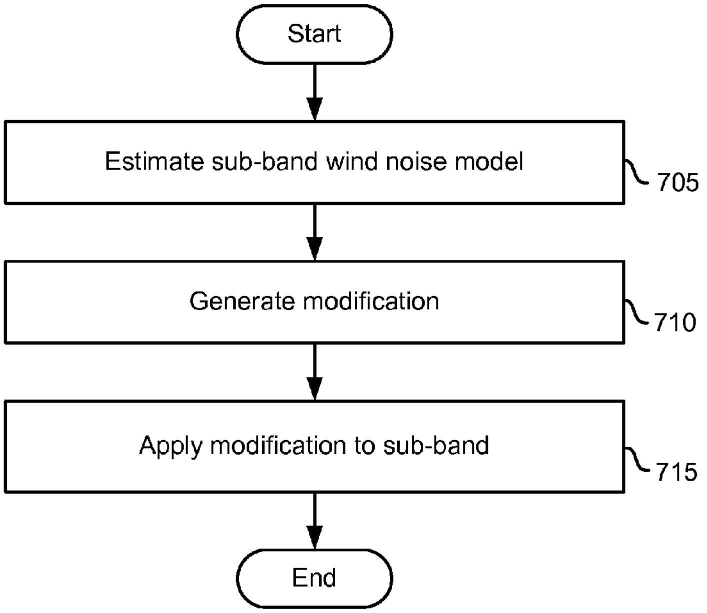
FIG. 7 is a flowchart of an exemplary method for suppressing detected wind noise in a device with one microphone.

FIG. 7 is a flowchart of an exemplary method for suppressing detected wind noise in a device with at least one microphone. A sub-band wind noise model may be estimated at step 705. The wind noise model may be estimated based on features extracted from one or more microphones and the characterization of the sub-band signal. The sub-band wind noise model may be based on a function fit to the detected wind noise energy, such as an inverse frequency function.

A modification to an acoustic signal may be generated at step 710. The modification may be based on the sub-band wind noise model and applied by a modifier module. The modification may be applied to the acoustic sub-band at step 715. A modifier module may apply the modification to the sub-band characterized as having wind noise using a Wiener filter.

Figure 8:
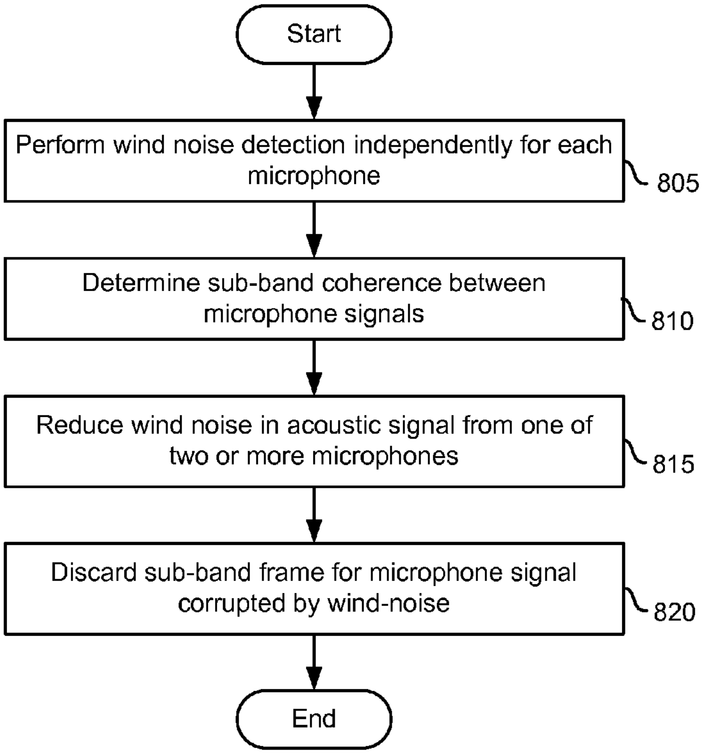
FIG. 8 is a flowchart of an exemplary method for suppressing detected wind noise in a device with more than one microphone.

FIG. 8 is a flowchart of an exemplary method for suppressing detected wind noise in a device with more than one microphone. Wind noise detection may be performed independently for each microphone at step 805. A sub-band coherence may be determined between microphone signals at step 810, for example using the formulation $$c_{12}[t,k] = \frac{|r_{12}[t,k]|}{r_{11}[t,k] + r_{22}[t,k]}$$

where $r_{ij}[t,k]$ denotes the lag-zero correlation between the i-th microphone signal and the j-th microphone signal for sub-band k at time t. Alternative formulations such as $$c_{12}[t,k] = \frac{|r_{12}[t,k]|}{\sqrt{r_{11}[t,k]r_{22}[t,k]}}$$

may be used in some embodiments. Speech and non-wind noise may be relatively similar, i.e., coherent or correlated, between corresponding sub-bands of different microphone signals as opposed to wind noise between signal sub-bands. Hence, a low coherence between corresponding sub-bands of different microphone signals may indicate the likely presence of wind noise in those particular microphone sub-band signals.

Wind noise reduction may be performed in an acoustic signal in one of two or more signals at step 815. The wind noise reduction may be performed in a sub-band of an acoustic signal characterized as having wind noise. The wind noise reduction may be performed in multiple acoustic signals if more than one signal is characterized as having wind noise. In embodiments where a coherence function is used in the characterization engine, a multiplicative mask for wind noise suppression may be determined as $$M[t,k] = \begin{cases} 1 & c_{12}[t,k] \geq c_T \\ \left(\frac{c_{12}[t,k]}{c_T}\right)^{\beta} & c_{12}[t,k] < c_T \end{cases}$$

where $c_T$ is a threshold for the coherence above which no modification is carried out (since the mask is set to 1). When the coherence is below the threshold, the modification is determined so as to suppress the signal in that sub-band and time frame in proportion to the level of coherence. A parameter $\beta$ may be used to tune the behavior of the modification.

A sub-band having wind noise within a frame may be discarded at step 820. The sub-band may be corrupted with wind noise and therefore may be removed from the frame before the frame is processed for additional noise suppression. The present technology may discard the sub-band having the wind noise, multiple sub-bands, or the entire frame for the acoustic signal.

Additional functions and analysis may be performed by the audio processing system with respect to detecting and processing wind noise. For example, the present technology can discard a frame due to wind noise corruption, and may carry out a "repair" operation—after discarding the frame—for filling in the gap. The repair may help recover any speech that is buried within the wind noise. In some embodiments, a frame may be discarded in a multichannel scenario where there is an uncorrupted channel available. In this case, the repair would not be necessary, as another channel could be used.

The steps discussed in FIGS. 5-8 may be performed in a different order than that discussed, and the methods of FIGS. 5-8 may each include additional or fewer steps than those illustrated.

The above described modules, including those discussed with respect to FIG. 3, may include instructions stored in a storage media such as a machine readable medium (e.g., computer readable medium). These instructions may be retrieved and executed by the processor 202 to perform the functionality discussed herein. Some examples of instructions include software, program code, and firmware. Some examples of storage media include memory devices and integrated circuits.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for performing noise reduction, comprising:

transforming an acoustic signal from time domain to frequency domain sub-band signals, the acoustic signal representing at least one captured sound;

extracting, using at least one hardware processor, a feature from a sub-band of the transformed acoustic signal;

detecting the presence of wind noise based on the feature;

generating a modification to suppress the wind noise based on the feature; and before reducing other noise within the transformed acoustic signal, applying the modification to suppress the wind noise.

2. The method of claim 1, wherein the feature includes a ratio between an energy level in a low frequency sub-band and a total signal energy.

3. The method of claim 1, wherein the feature includes a variance of a ratio between an energy in a low frequency sub-band and a total signal energy.

4. The method of claim 1, further comprising characterizing at least one of the sub-band signals as having wind noise.

5. The method of claim 4, wherein the characterizing is based on a characterization engine trained with wind noise data.

6. The method of claim 5, wherein an output of the characterization engine includes a binary classification.

7. The method of claim 4, further comprising smoothing the characterization of wind noise over frames of the transformed acoustic signal.

8. The method of claim 1, wherein the modification includes deriving a wind noise model by fitting a function to a signal spectrum for the transformed acoustic signal.

9. The method of claim 1, further comprising:

extracting another feature from the sub-band of the transformed acoustic signal; and detecting the presence of wind noise further based on the other feature.

10. The method of claim 9, wherein the feature and the other feature include at least two of: a ratio between energy levels in low frequency sub-bands and a total signal energy, a mean of the ratio, a variance of the ratio, and a coherence between microphone signals.

11. The method of claim 1, the other noise being environmental noise other than wind noise.

12. A system for reducing noise in an acoustic signal, the system comprising:

a wind noise characterization engine executable, using at least one hardware processor, to provide a wind noise characterization of a first acoustic signal, the first acoustic signal representing at least one captured sound;

a mask generator executable to generate a modification to suppress wind noise; and a modifier module configured to apply the modification to suppress the wind noise based on the wind noise characterization, before environmental noise is reduced within the first acoustic signal.

13. The system of claim 12, further comprising a memory and a first microphone configured to receive the first acoustic signal.

14. The system of claim 12, further comprising a feature extraction module to extract features from the first acoustic signal, the wind noise characterization based on the features.

15. The system of claim 12, further comprising a transform module to transform the first acoustic signal from a time domain to a frequency domain.

16. The system of claim 12, further comprising a second acoustic signal, the second acoustic signal representing at least one captured sound, and the wind noise characterization engine configured to characterize the first and second acoustic signals independently.

17. The system of claim 16, further comprising determining a coherence function between the first and second acoustic signals.

18. A non-transitory computer readable storage medium having embodied thereon a program, the program being executable by a processor to perform a method for reducing noise in an audio signal, the method comprising:

transforming an acoustic signal from time domain to frequency domain sub-band signals, the acoustic signal representing at least one captured sound;

extracting, using at least one hardware processor, a feature from a sub-band of the transformed acoustic signal;

detecting the presence of wind noise based on the feature;

generating a modification to suppress the wind noise based on the feature; and before reducing environmental noise within the transformed acoustic signal, applying the modification to suppress the wind noise.

19. The non-transitory computer readable storage medium of claim 18, the method further comprising generating the modification to suppress the wind noise based on the feature.

20. The non-transitory computer readable storage medium of claim 19, wherein the modification to suppress the wind noise comprises discarding at least one frame of the transformed acoustic signal, wherein the at least one frame exhibits the wind noise.

* * * * *